Dec. 29, 1964   W. F. NIKLAS   3,163,765
GAMMA RAY IMAGE CONVERTERS
Filed June 14, 1961

INVENTOR.
Wilfrid F. Niklas
BY

United States Patent Office 3,163,765
Patented Dec. 29, 1964

3,163,765
GAMMA RAY IMAGE CONVERTERS
Wilfrid F. Niklas, Park Ridge, Ill., assignor to The Rauland Corporation, a corporation of Illinois
Filed June 14, 1961, Ser. No. 117,051
11 Claims. (Cl. 250—213)

The present invention relates to image converters and more particularly to gamma ray image converters.

The testing and continuous inspection of dense materials of large dimensions, such as heavy walled cylinders, heavy steel plates and the like, is of great importance for aviation, space vehicle, steel and other heavy industries. Nnon-destructive instrumentation is necessary for this type of testing and inspection.

Due to the relatively low energy of X-rays, devices operating with X-rays may not be satisfactorily employed for this purpose. Accordingly, gamma ray photography has been the only previously available technique. However, the use of gamma rays in conjunction with photographic emulsions requires long exposure and developing time.

Morevor, there are numerous physical environments of testing in which photographic processes are not feasible. In rolling mills, for instance, steel billets are formed into slabs four inches thick, four feet wide and ten feet long. The ends of the red hot slabs are visually inspected for gas bubbles, pieces of slag or other flaws. When such flaws are found, the operator shears off and scraps about six inches of the slab, and inspects again. This operation is continued until no more defects can be detected, a process which obviously is time consuming and wastes a considerable amount of good steel. A continuous assembly line inspection system would provide substantial savings in both material and labor; it has been estimated that savings of only one inch of good steel from each slab would result in industry savings of millions of dollars annually.

In solid rockets it is vitally important that the fuel be properly packed to insure uniform burning. The inspection of finished rockets, utilizing presently available methods with gamma rays and photographic film, is time consuming and complicated. Instantaneous and continuous inspection systems, if obtainable, would result in substantial advantages and economies.

Other potential applications are in nuclear reactors for such purposes as to observe the flow of molten metals through pumps and pipes, and in general for inspection of castings and other metal objects that are too dense for X-ray study.

It has also been known in the art that image converter tubes, responsive to neutron or gamma ray radiation, may be useful for the above-described purposes. However, there have been no gamma ray image converters adaptable to continuous assembly line inspection, or even instantaneous single-shot inspection of the type required for industrial applications such as those mentioned above.

It is therefore a primary object of the present invention to provide a new gamma ray image converter for continuous or instantaneous inspection of dense materials.

It is a further object of the present invention to provide a new and improved gamma ray image converter, which provides greatly increased sensitivity as compared with prior devices.

A gamma ray image converter constructed in accordance with the invention comprises, within an evacuated envelope, a composite pick-up screen comprising an alkali-metal activated electron emissive layer, means including a heavy metal target layer in juxtaposition with the emissive layer and responsive to incident gamma radiation for energizing the first-mentioned layer to emit electrons, means including an inert coating on the target layer for inhibiting interaction between the alkali metal and the target layer, and means for utilizing the electrons emitted by the first-mentioned layer to produce a visible image.

The features of this invention, which are believed to be novel, are set forth with particularity in the appended claims. The invention, together with further objects and advantages thereof, may best be understood, however, with reference to the following description taken in connection with the accompanying drawing, in the several figures of which like reference numerals identify like elements, and in which:

Figure 1:
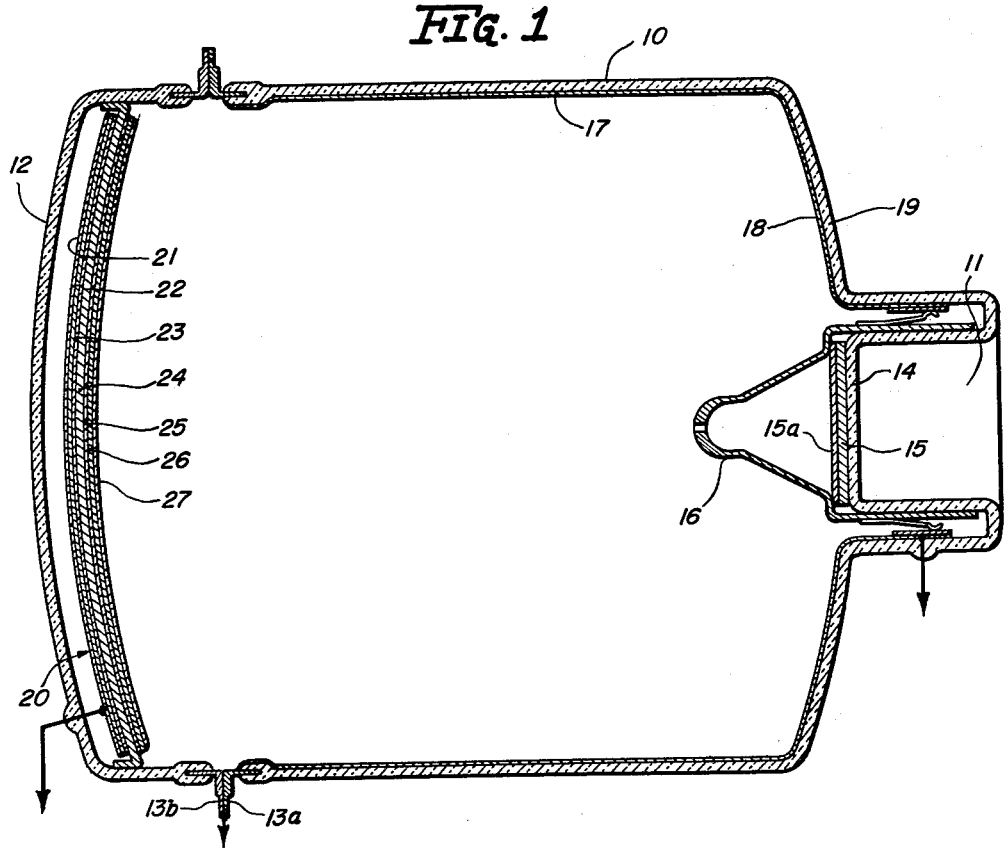
FIGURE 1 is a cross-sectional view of a gamma ray image converter embodying this invention.

The image converter, represented in FIGURE 1, comprises a substantially cylindrical enveope section 10 which is preferably made of glass, although it may be constructed of metal or any other suitable material. The envelope section 10 has an end portion in the form of a re-entrant press 11, and the opposite end is provided with a face-plate section 12, which may be of spherical configuration and of a diameter approximately equal to that of the envelope section 10. Envelope sections 10 and 12 are presealed around their entire perimeters to respective metal flanges 13a and 13b which, in turn, are sealed together in known manner by heliarc welding or the like after the two envelope sections 10 and 12 have been separately processed.

The re-entrant section 11 is closed by a flat glass plate 14 on the inside of which a fluorescent viewing screen 15 of suitable fluorescent material is provided in conjunction with a metallic-backing layer 15a sufficiently thin to be pervious to impinging electrons. An electron-optical system within the envelope causes electrons to impinge on screen 15 in order to synthesize a visible image thereon.

The electron-optical system of the image converter, disposed inside of the envelope 10, includes a large diameter photo-sensitive cathode structure 20 which is generally referred to in the art as a composite, multi-layer pick-up screen. This cathode structure is suitably mounted within the section 12 of the envelope and is preferably of spherically curved configuration. It is positioned transversely of an substantially coaxial with the axis of the envelope which corresponds with the axis of an electron-optical path along which electrons, emitted from the cathode, are projected toward viewing screen 15. Such emitted electrons are accelerated and focused by an electrode system comprising a conductive wall coating 17 on envelope section 10, and an anode thimble 16 encompassing viewing screen 15; preferably a semi-conductive coating 18 is provided on shoulder portion 19 of the envelope, in the manner described and claimed in the co-pending application of Wilfrid F. Niklas, Serial No. 715,376, filed February 14, 1958, for Electron Discharge Device, which is assigned to the same assignee as the present application. The entire construction, with the exception of composite pick-up screen 20, may be identical with that employed in conventional image intensifiers such as the Image Intensifier R-6175, produced and sold by The Rauland Corporation, Chicago, Illinois.

The composite pick-up screen 20 comprises a spherically curved aluminum support plate or dish 24 of conventional construction, mounted within the envelope end section 12 in the usual manner. On the convex, outer surface of support 24, is provided a target layer 22 of heavy metal, preferably lead although tantalum, gold or uranium may be employed instead. Thin metal layers 21 and 23, which may be formed of aluminum or gold, are provided on the exposed surfaces of lead layer 22. On the concave, inner surface of support 24 is a radiation-sensitive phosphor layer 25, such as silver-activated zinc sulphide or the like, embedded in a suitable silicone resin. A barrier layer 26, which may be of aluminum oxide, is superposed over phosphor layer 25, and a photoemissive layer 27 is placed over barrier layer 26. In an image converter embodying the invention, photo-emissive layer 27 is of the alkali-metal activated type, such as antimony-caesium or caesiated silver oxide, and constitutes an electron emissive surface. Layers 25, 26 and 27 correspond to those employed in other types of image converters and may be entirely conventional both as to composition and method of manufacture.

In operation, when a gamma ray image is directed to the end section 12 of the envelope, it impinges upon the lead target layer 22. Impinging high-energy gamma ray quanta cause either photo-electron and Compton electron emission, or pair production, depending upon the energy of the impinging quanta. All of the thus produced radiation passes through the aluminum layer 23 which is of minimal thickness so as not to materially affect the sensitivity of the device to the incident radiation. Electrons emanating from the lead target layer 22 are slowed down, without accompanying energy conversion, by aluminum support 24, which thus functions as a moderating layer, and impinge onto the phosphor layer 25. In response thereto, phosphor layer 25 gives rise to photon emission in the visible band. These photons traverse barrier layer 26 and excite photo-emissive layer 27 which, in turn, emits photo-electrons, the density distribution of which is the counterpart of the gamma ray image initially received. In an entirely conventional manner, this electron image is focused, accelerated and projected upon viewing screen 15 where it is converted to a visible image.

Aluminum layers 21 and 23 substantially encompass target plate 22 and prevent the exposure of unavoidable surface oxides on target layer 22 to the alkali-metal vapors employed to activate photo-emissive layer 27; the inherent low sensitivity of prior art gamma ray image converters is attributable in large measure to the gettering of alkali-metal vapors by such surface oxides, a phenomenon which is prevented by the construction of the present invention. Aluminum-cladding of target layer 22, in accordance with the invention, has been found to increase the sensitivity of the photo-cathode appreciably and improves the yield of the device in production.

In accordance with another aspect of the invention, a still further improvement in useful sensitivity may be achieved in certain environments, requiring exposure to gamma rays of especially high energy. It is known that gamma rays emitted by linear accelerators operating with electron energies in the ten million electron-volts (MeV) range or higher, are not monochromatic. For example, a typical 35 mev. linear accelerator having a tungsten target, emits gamma rays of an average energy of 5 to 6 mev. with peaks reaching into 30 mev. range and an appreciable amount of radiation between 1 and 5 mev. The "hard" or high-energy, components of the gamma ray beam gives rise to spurious "softer" or lower-energy electro-magnetic radiation which in turn may yield, by multiple scattering, radiation below the 5 mev. band. This radiation, which does not carry any useful information, may nevertheless be picked up by the pick-up screen of the image converter, leading to an increase in noise-background and substantially reduced contrast of the output image.

Figure 2:
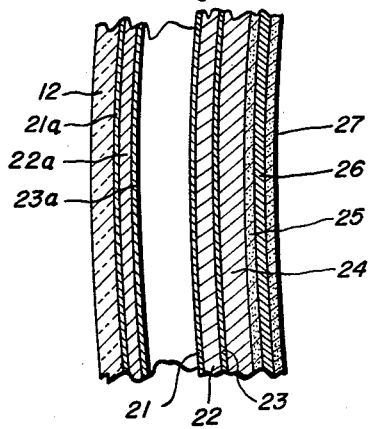
FIGURE 2 is an enlarged fragmentary cross-sectional view of a modified input section useful in the device of FIGURE 1.

To eliminate or materially reduce the effect of such noise interference, an additional filtering layer 22a is provided between the radiation source and the first energy conversion layer 22, as shown in FIGURE 2. Layer 22a also consists of a heavy metal such as lead, tantalum, gold or uranium, and is also coated with protective layers 21a, 23a, preferably aluminum, to seal off the unavoidable surface oxide layers. Filtering layer 22a is advantageously disposed on the inner surface of the frontplate 12 of envelope 10, spaced from the pick-up screen assembly 21–27.

This filtering layer 22a is of sufficient thickness to selectively absorb all the radiation between 1 and 5 mev. regardless of the origin thereof, and thus substantially improve the contrast of the image. Lead plates 22 and 22a are each preferably 0.01 to 0.05 inch thick and coated with aluminum layers 21, 23, 21a, 23a, of $0.6 \times 10^{-5}$ inch thickness, the thickness of the aluminum support plate 24 being 0.01 to 0.012 inch.

Figure 3:
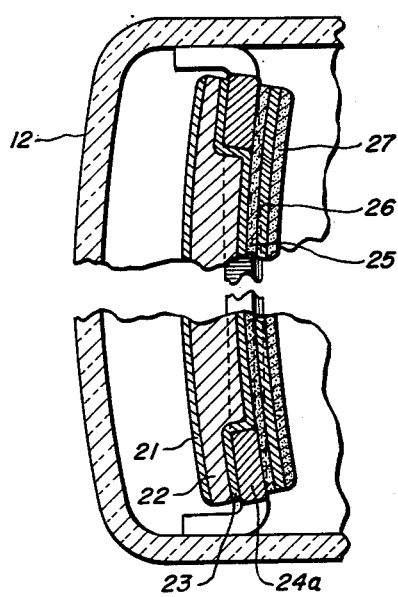
FIGURE 3 is an enlarged fragmentary cross-sectional view of a further modification of the input section useful in the device of FIGURE 1.

In accordance with a further modification of the present invention, the resolution of the reproduced image may be materially improved by the use of a pick-up screen of slightly modified construction, as shown in FIGURE 3. Aluminum support plate 24 is replaced by an annular aluminum support ring 24a, and the profile of the aluminum-clad lead layer 22 is modified to provide a front portion 28 thereof, extending through the aluminum ring 24a into close proximity with the phosphor layer 25, being separated from the phosphor only by the thin aluminum coating 23. The resulting improvement in image resolution is achieved at the expense of slightly reduced sensitivity owing to the omission of the retarding effect of support plate 24, with the result that some of the electrons originating at target layer 22 retain sufficiently high energy to penetrate phosphor layer 25 without effecting light emission. Accordingly, this modification is most useful in conjunction with gamma ray sources of moderate energy levels, for use in inspection and testing of materials of lesser density or thickness than those for which the pick-up screens of FIGURES 1 and 2 are best adapted.

In an illustrative application of the inventive image converter, a cobalt 60 source may be used to direct gamma rays through the material to be inspected onto the heavy metal plate of the image converter tube of FIGURE 1. Here some of the energy of the gamma rays is transferred to electrons of low enough intensity to produce a fluoroscopic image, which is intensified by the inventive tube to produce a picture about 1000 times brighter, sufficient to provide a clear picture on a remote TV screen (closed circuit) for monitoring or to be viewed directly through an optical system. Such an arrangement is well adapted to instantaneous and continuous testing and inspection of dense metal objects, such as the inspection of steel billets and other industrial applications in which such inspection has long been recognized as desirable but which has nevertheless not previously been capable of attainment.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A gamma ray image converter comprising, within an evacuated envelope: a composite pick-up screen comprising an alkali-metal activated electron emissive layer; means including a heavy metal target layer having one surface in juxtaposition with said emissive layer and responsive to incident gamma radiation for energizing said first-mentioned layer to emit electrons; means including an inert coating at least on the surface of said target layer opposed to said one surface for inhibiting interaction between said alkali metal and said target layer; and means for utilizing the electrons emitted by said first-mentioned layer to produce a visible image.

2. A gamma ray image converter as in claim 1, in which said heavy metal target layer is composed of one of the group of metals consisting of lead, tantalum, gold and uranium.

3. A gamma ray image converter as in claim 2, in which said inert coating on said target layer is aluminum.

4. A gamma ray image converter as in claim 2, in which said heavy metal layer is composed of lead of a thickness of 0.01 to 0.05 inch.

5. A gamma ray image converter as in claim 1, in which a moderating layer is provided between said target layer and said pick-up screen for retarding particles originating at said target layer.

6. A gamma ray image converter comprising, within an evacuated envelope: a fluorescent layer for converting incident radiation into visible light emission, a transparent barrier layer adjacent said fluorescent layer, an alkali-metal activated photo-emissive layer in intimate contact with said barrier layer for converting said visible light emission into photo-electrons, means including a heavy metal target layer having one surface in juxtaposition with said fluorescent layer and responsive to incident gamma radiation for energizing said fluorescent layer; means including an inert coating at least on the surface of said target layer opposed to said one surface for inhibiting interaction between said alkali metal and said target layer; and means for utilizing the electrons emitted by said photo-emissive layer to produce a visible image.

7. A gamma ray image converter comprising, within an evacuated envelope: a composite pick-up screen comprising an alkali-metal-activated electron-emissive layer; means including a heavy metal target layer in juxtaposition with said electron emissive layer and responsive to incident gamma radiation for energiznig said first-mentioned layer to emit electrons; means including a second heavy metal target layer overlying said first heavy metal layer for absorbing the lower energy gamma radiations; means including an inert coating on the opposed faces of both of said target layers for inhibiting interaction between said alkali-metal and said target layers; and means for utilizing the electrons emitted by said first-mentioned layer to produce a visible image.

8. A gamma ray image converter as in claim 7, in which each of said heavy metal target layers is composed of one of the group of metals consisting of lead, tantalum, gold and uranium, and said inert coating on said target layers are aluminum.

9. A gamma ray image converter comprising, within an evacuated envelope: a fluorescent layer for converting incident radiation into visible light emission, a transparent barrier layer adjacent said fluorescent layer, an alkali-metal-activated photo-emissive layer in intimtae contact with said barrier layer for converting said visible light emission into photo-electrons, means including a heavy metal target layer having one surface in juxtaposition with said fluorescent layer and responsive to incident gamma radiation for energizing said fluorencest layer; means including an annular shaped supporting plate between said target layer and said pick-up screen, said target layer extending into said annular-shaped plate into juxtaposition with the pick-up screen; means including an inert coating at least on the surface of said target layer opposed to said one surface for inhibiting interaction between said alkali metal and said target layer; and means for utilizing the electrons emitted by said first-mentioned layer to produce a visible image.

10. A gamma ray image converter comprising, within an evacuated envelope: a fluorescent layer for converting incident radiation into visible light emission, a transparent barrier layer adjacent said fluorescent layer, an alkali-metal-activated photo-emissive layer in intimate contact with said barrier layer for converting said visible light emission into photo-electrons, means including a heavy metal target layer having one surface in juxtaposition with said fluorescent layer and responsive to incident gamma radiation for energizing said fluorescent layer; means including an annular shaped supporting plate of inert metal between said target layer and said pick-up screen, said target layer being formed to extend through the opening of said annular shaped plate into intimate contact with said pick-up screen; means including an inert coating at least on the surface of said target layer opposed to said one surface for inhibiting interaction between said alkali metal and said target layer; and means for utilizing the electrons emitted by said first-mentioned layer to produce a visible image.

11. A gamma ray image converter as in claim 9, in which said annular shaped supporting plate is of aluminum.

References Cited by the Examiner
UNITED STATES PATENTS

| Re. 24,383 | 10/57 | McKay | 250—71.5 |
| 2,186,757 | 1/40 | Kallmann | 250—71.5 |
| 2,739,243 | 3/56 | Sheldon | 250—71.5 |
| 2,760,077 | 8/56 | Longini | 250—213 |
| 2,829,264 | 4/58 | Garrison | 250—71.5 |
| 2,955,218 | 10/60 | Schmidt | 250—80 |

RALPH G. NILSON, *Primary Examiner.*